US012596829B2

(12) United States Patent
Yang

(10) Patent No.: US 12,596,829 B2
(45) Date of Patent: Apr. 7, 2026

(54) DATABASE PROCESSING METHOD, APPARATUS, DEVICE, AND MEDIUM

(71) Applicant: Beijing Volcano Engine Technology Co., Ltd., Haidian District (CN)

(72) Inventor: Xinying Yang, Los Angeles, CA (US)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 71 days.

(21) Appl. No.: 18/795,481

(22) Filed: Aug. 6, 2024

(65) Prior Publication Data

US 2025/0053676 A1    Feb. 13, 2025

(30) Foreign Application Priority Data

Aug. 7, 2023    (CN) .......................... 202310989103.4

(51) Int. Cl.
*G06F 21/00* (2013.01)
*G06F 21/60* (2013.01)
*G06F 21/62* (2013.01)

(52) U.S. Cl.
CPC ........ *G06F 21/6218* (2013.01); *G06F 21/602* (2013.01)

(58) Field of Classification Search
CPC .............. G06F 21/6218; G06F 21/602; G06F 21/6227; G06F 21/6245; G06F 21/31; G06F 21/53; G06F 21/604
See application file for complete search history.

(56) References Cited

U.S. PATENT DOCUMENTS

| | | | |
|---|---|---|---|
| 2016/0267295 A1* | 9/2016 | Gervais | G16H 10/40 |
| 2017/0053099 A1* | 2/2017 | Coughlin | G07F 17/0092 |
| 2021/0258624 A1* | 8/2021 | Garfinkel | H04N 21/2542 |
| 2022/0391057 A1* | 12/2022 | Yu | G06F 21/84 |

OTHER PUBLICATIONS

S. Almakdi and B. Panda, "Secure and Efficient Query Processing Technique for Encrypted Databases in Cloud," 2019 2nd International Conference on Data Intelligence and Security (ICDIS), South Padre Island, TX, USA, 2019, pp. 120-127, doi: 10.1109/ICDIS. 2019.00026. (Year: 2019).*

* cited by examiner

*Primary Examiner* — Ka Shan Choy
(74) *Attorney, Agent, or Firm* — Alleman Hall LLP

(57) ABSTRACT

A method includes: receiving an access request for a database, the access request carries a user identifier of an access party and a data processing instruction; when specified data and/or target data are subset data in encrypted data, querying an authorization information table in the database based on the user identifier of the access party to detect whether the access party is an authorized user for the specified data and/or the target data; detecting whether the subset data belongs to subset information in the specified data and/or the target data that does not require authorized access when the access party is not the authorized user for the specified data and/or the target data; and when the subset data belongs to the subset information that does not require authorized access, executing the data processing instruction to obtain target data, and returning the target data in response to the access request.

20 Claims, 3 Drawing Sheets

Receive an access request for a database, where the access request carries a user identifier of an access party and a data processing instruction, and the data processing instruction is used to indicate processing of specified data in the database to obtain target data — 101

In response to the specified data and/or the target data being subset data in encrypted data, query an authorization information table in the database based on the user identifier of the access party to detect whether the access party is an authorized user for the specified data and/or the target data, where the encrypted data comprises data stored in the database in an encrypted form, and the authorization information table is used to record authorized user information configured by a data party for the encrypted data and to record subset information that does not require configured access and is configured by the data party for the encrypted data — 102

In response to the access party being not the authorized user for the specified data and/or the target data, detect whether the subset data belongs to the subset information in the specified data and/or the target data that does not require authorized access — 103

In response to the subset data belonging to the subset information in the specified data and/or the target data that does not require authorized access, execute the data processing instruction to process the specified data to obtain target data, and return the target data in response to the access request — 104

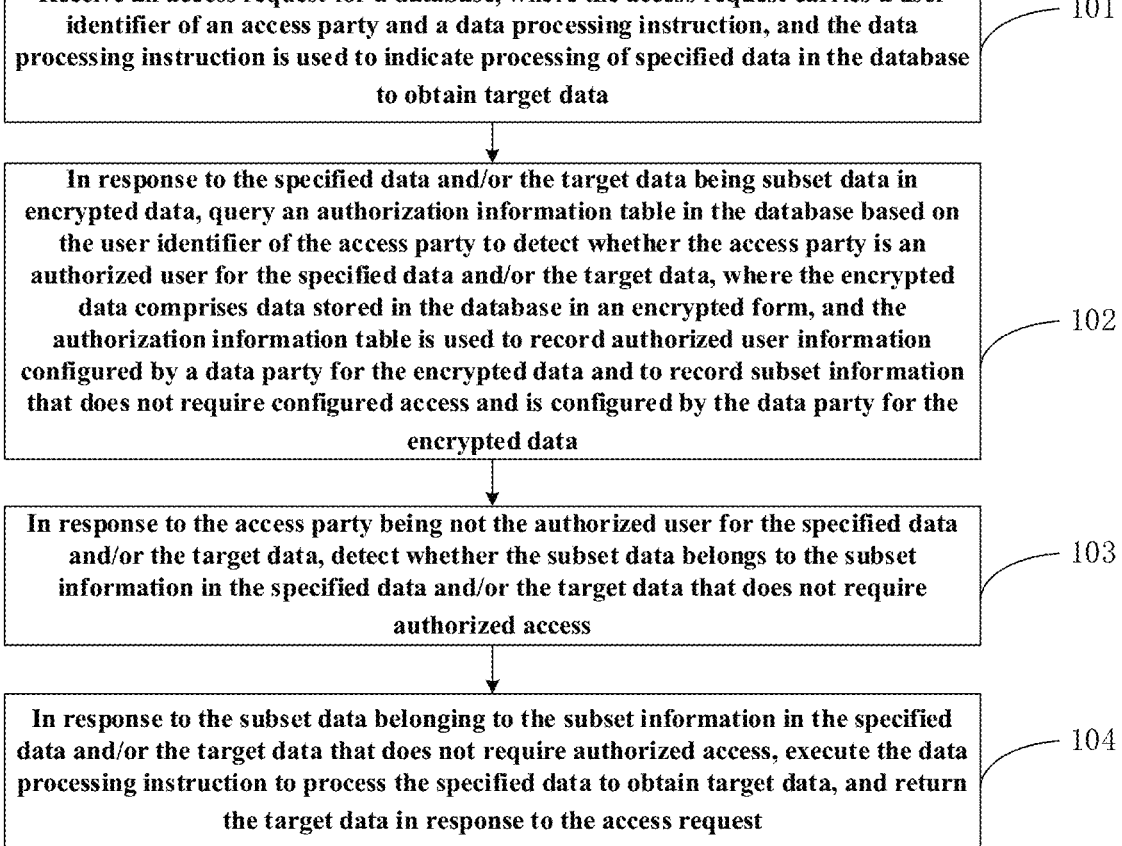

Receive an access request for a database, where the access request carries a user identifier of an access party and a data processing instruction, and the data processing instruction is used to indicate processing of specified data in the database to obtain target data — 101

In response to the specified data and/or the target data being subset data in encrypted data, query an authorization information table in the database based on the user identifier of the access party to detect whether the access party is an authorized user for the specified data and/or the target data, where the encrypted data comprises data stored in the database in an encrypted form, and the authorization information table is used to record authorized user information configured by a data party for the encrypted data and to record subset information that does not require configured access and is configured by the data party for the encrypted data — 102

In response to the access party being not the authorized user for the specified data and/or the target data, detect whether the subset data belongs to the subset information in the specified data and/or the target data that does not require authorized access — 103

In response to the subset data belonging to the subset information in the specified data and/or the target data that does not require authorized access, execute the data processing instruction to process the specified data to obtain target data, and return the target data in response to the access request — 104

FIG. 1

DATABASE PROCESSING METHOD, APPARATUS, DEVICE, AND MEDIUM

CROSS-REFERENCE TO RELATED APPLICATION(S)

This application claims priority to Chinese Application No. 202310989103.4 filed on Aug. 7, 2023, the present disclosure of which is incorporated herein by reference in its entirety.

FIELD

The present disclosure relates to the technical field of data processing, and particularly to a database processing method, an apparatus, a device, and a medium thereof.

BACKGROUND

In the related art, data is transmitted to a database so as to be stored on a disk of a cloud database. However, a processing environment where the database is located has poor credibility and is vulnerable to malicious attacks by criminals, who may decrypt and tamper with important data. Therefore, any data interaction involved between a database and another entity, such as data transmission between the database and a user side, or between the database and another hardware platform, requires frequent data encryption and decryption. However, in many business scenarios, part of data that needs to be processed is actually public and transparent data, and there is no need to frequently encrypt and decrypt the part of data. Based on the above operations, only security can be guaranteed, but the efficiency of database processing cannot be guaranteed. Especially when the demand for the database is relatively high, the solution easily causes a system crash, making actual business requirements difficult to meet.

SUMMARY

In order to solve the above technical problems or at least partially solve the above technical problems, the present disclosure provides a database processing method and apparatus, a device, and a medium, thereby improving the efficiency of data processing, ensuring security and reliability of data processing, and further improving the efficiency of data processing.

An embodiment of the present disclosure provides a database processing method. The method includes: receiving an access request for a database, where the access request carries a user identifier of an access party and a data processing instruction, the data processing instruction is used to indicate processing of specified data in the database to obtain target data, and the database is deployed in an separated secure execution environment; querying an authorization information table in the database based on the user identifier of the access party to detect whether the access party is an authorized user for the specified data and/or the target data in response to the specified data and/or the target data being subset data in encrypted data, where the encrypted data refers to data stored in the database in an encrypted form; and the authorization information table is used to record authorized user information configured by a data party for the encrypted data and to record subset information that does not require authorized access and is configured by the data party for the encrypted data; detecting whether the subset data belongs to the subset information in the specified data and/or the target data that does not require authorized access in response to the access party being not the authorized user for the specified data and/or the target data; and in response to the subset data belonging to the subset information in the specified data and/or the target data that does not require authorized access, executing the data processing instruction to process the specified data to obtain target data, and returning the target data in response to the access request.

An embodiment of the present disclosure further provides a database processing apparatus. The apparatus includes: a receiving module, configured to receive an access request for a database, where the access request carries a user identifier of an access party and a data processing instruction, the data processing instruction is used to indicate the processing of specified data in the database to obtain target data, and the database is deployed in an separated secure execution environment; a first detection module, configured to query an authorization information table in the database based on the user identifier of the access party to detect whether the access party is an authorized user for the specified data and/or the target data in response to the specified data and/or the target data being subset data in encrypted data, where the encrypted data refers to data stored in the database in an encrypted form; and the authorization information table is used to record authorized user information configured by a data party for the encrypted data and to record subset information that does not require authorized access and is configured by the data party for the encrypted data; a second detection module, configured to detect whether the subset data belongs to the subset information in the specified data and/or the target data that does not require authorized access in response to the access party being not the authorized user for the specified data and/or the target data; and configured to in response to the subset data belonging to the subset information in the specified data and/or the target data that does not require authorized access a response module, execute the data processing instruction to process the specified data to obtain target data, and return the target data in response to the access request.

An embodiment of the present disclosure further provides an electronic device. The electronic device includes: a processor; and a memory configured to store executable instructions of the processor. The processor is configured to read the executable instructions from the memory and execute the instructions to implement the database processing method provided by this embodiment of the present disclosure.

An embodiment of the present disclosure further provides a computer-readable storage medium. The storage medium stores a computer program. The computer program is used to implement the database processing method provided by this embodiment of the present disclosure.

Compared with the prior art, the technical solutions provided by the embodiments of the present disclosure have the following advantages: according to the database processing solution provided in this embodiment of the present disclosure, the access request for the database is received, where the access request carries the user identifier of the access party and the data processing instruction, the data processing instruction is used to indicate the processing of the specified data in the database to obtain the target data, the database is deployed in the separated secure execution environment; when the specified data and/or the target data are the subset data in the encrypted data, the authorization information table in the database is queried based on the user identifier of the access party to detect whether the access party is the authorized user for the specified data and/or the target data, where the encrypted data refers to the data stored in the database in the encrypted form; the authorization information table is used to record the authorized user information configured by the data party for the encrypted data and to record the subset information that does not require authorized access and is configured by the data party for the encrypted data; whether the subset data belongs to the subset information in the specified data and/or the target data that does not require authorized access is detected when the access party is not the authorized user for the specified data and/or the target data; and the data processing instruction is executed to process the specified data to obtain the target data, and the target data is returned in response to the access request when the subset data belongs to the subset information in the specified data and/or the target data that does not require authorized access.

In this embodiment of the present disclosure, the database is completely encapsulated within the separated secure execution environment, thereby achieving integration between the database and the secure execution environment. By isolating the relevant data within the secure execution environment, data security is ensured, and the interaction between the user side and the database is more convenient. There is no need for data encryption before transmission on the user side, and the database does not require tedious data interaction with other security platforms, thereby improving the efficiency of data processing. Additionally, in the technical solution, the specified data and/or the target data are determined based on the data processing instruction sent by the access party. Encryption detection is performed on the specified data and/or the target data. If the specified data and/or the target data are the subset data of the encrypted data, the authorization detection is performed on the specified data and/or the target data based on the user identifier of the access party and the authorization information table. If the authorization detection fails, whether the subset data does not require authorized access may be detected. When the subset data does not require authorized access, the target data is returned. The data that does not require authorized access may be accessed by any user, thereby reducing the frequency of data encryption and decryption, and further improving the efficiency of data processing on the basis of ensuring the security and reliability of data processing.

BRIEF DESCRIPTION OF THE DRAWINGS

The foregoing and other features, advantages, and aspects of embodiments of the present disclosure become more apparent with reference to the following specific implementations and in conjunction with the accompanying drawings. Throughout the accompanying drawings, the same or similar reference numerals denote the same or similar elements. It should be understood that the accompanying drawings are illustrative, and components and elements may not necessarily be drawn to scale.

FIG. 1 is a schematic flowchart of a database processing method according to an embodiment of the present disclosure;

DETAILED DESCRIPTION OF EMBODIMENTS

Figure 2:
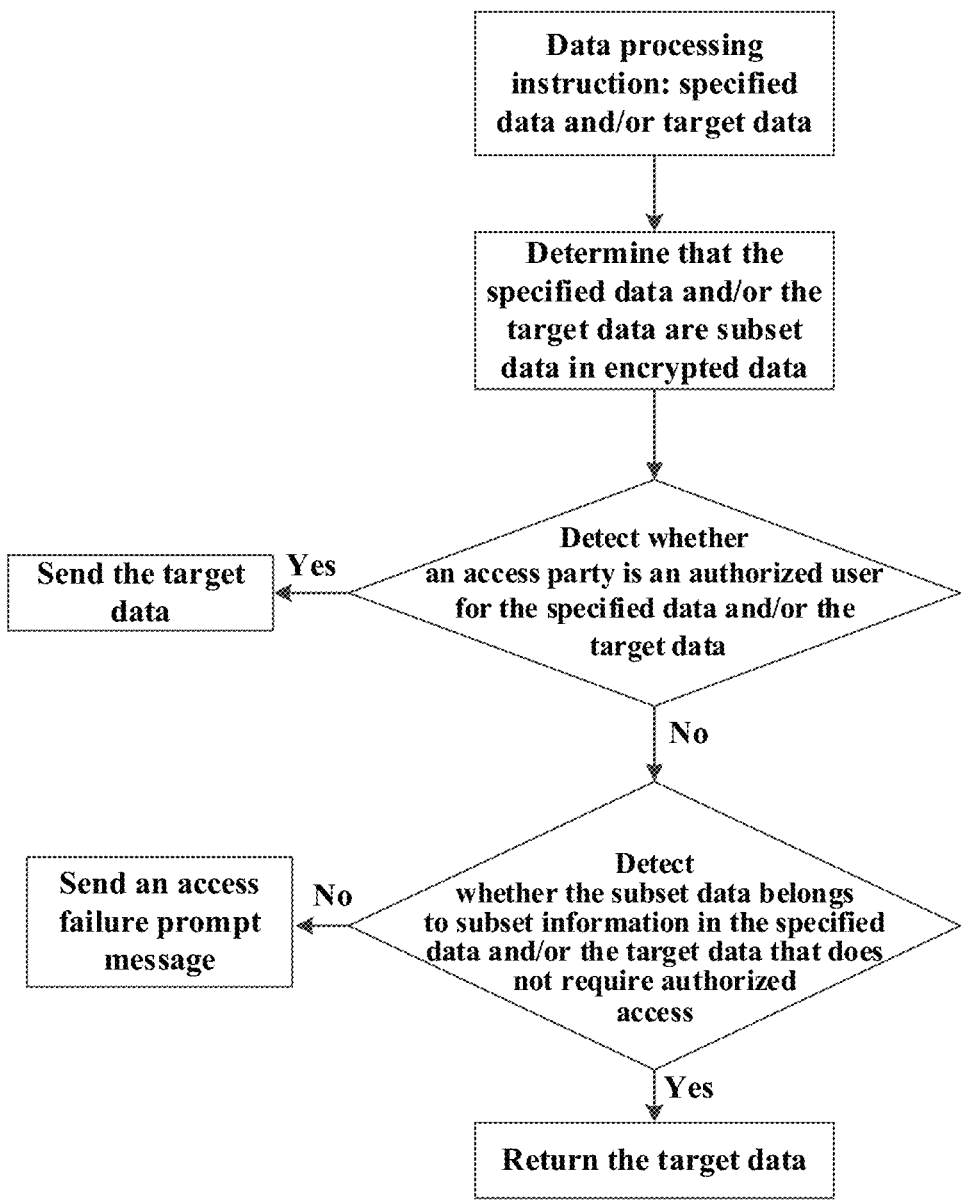
FIG. 2 is a schematic diagram of a database processing scenario according to an embodiment of the present disclosure.

The embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. On the contrary, these embodiments are provided for a more thorough and complete understanding of the present disclosure. It should be understood that the accompanying drawings and the embodiments of the present disclosure are for exemplary purposes only, and are not intended to limit the scope of protection of the present disclosure.

It should be understood that the steps recorded in the method implementations in the present disclosure may be performed in different orders and/or in parallel. Further, additional steps may be included and/or the execution of the illustrated steps may be omitted in the method implementations. The scope of the present disclosure is not limited in this aspect.

The term "including" used herein and variations thereof are open-ended, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". The related definitions of other terms will be provided in the subsequent description.

It should be noted that concepts such as "first" and "second" mentioned in the present disclosure are only used to distinguish different apparatuses, modules, or units, and are not used to limit the order or relation of interdependence of functions performed by these apparatuses, modules, or units.

It should be noted that modifier of "a" and "a plurality of" mentioned in the present disclosure are indicative rather than limiting, and those skilled in the art should understand that unless otherwise explicitly specified in the context, it should be interpreted as "one or more".

The names of messages or information exchanged between a plurality of apparatuses in the implementations of the present disclosure are provided for illustrative purposes only, and are not used to limit the scope of these messages or information.

To solve the above problems, an embodiment of the present disclosure provides a database processing method. In the method, a database is deployed in a separated secure execution environment, and further, is deployed in a trusted execution environment (TEE), where the trusted execution environment is a secure area of hardware or software of a device, is isolated from a main operating system, and provides a trusted environment to execute sensitive or critical code and data. Security in the TEE mainly comes from isolation from the main operating system and hardware protection measures. The database is deployed in a trusted execution environment that is based on trusted hardware. The TEE provides the secure execution environment where stored and executed code and data are protected. The TEE is composed of special hardware in a processor and prevents tampering or theft of code and data in the TEE through some security protection mechanisms. In addition, the TEE does not allow an ordinary application to access the code and data therein, thereby improving system security. Therefore, the TEE becomes an ideal platform for applications such as encryption, digital security, and security authentication. In embodiments of the present disclosure, the database is completely encapsulated into an executable environment, thereby integrating the database with the executable environment, isolating relevant data in the executable environment, ensuring data security, and making interaction between the user side and the database more convenient. There is no need to encrypt the data on the user side before transmission, and the database does not need to interact with other security platforms for tedious data interaction, thereby improving the efficiency of data processing.

The method is introduced in conjunction with specific embodiments as below.

FIG. 1 is a schematic flowchart of a database processing method according to an embodiment of the present disclosure. The method may be performed by a database processing apparatus. The apparatus may be implemented by software and/or hardware, and is typically integrated in an electronic device. As shown in FIG. 1, the method includes steps as described below.

Step 101: Receiving an access request for a database, where the access request carries a user identifier of an access party and a data processing instruction, and the data processing instruction is used to indicate processing of specified data in the database to obtain target data.

The access request may be a request sent by a user to access data in the database, and may carry a parameter needed for accessing the data. According to an embodiment of the present disclosure, the access request may include a user identifier of an access party and a data processing instruction. The user identifier of the access party may be a user identifier of an accessing user sending the access request currently, and the identifier is used to uniquely represent the current accessing user. The data processing instruction may be used to indicate processing of specified data in the database to obtain target data, which may be represented as a structured query language (SQL). Specified data may include all data involved in the data processing instruction, and the target data may be data that meets a requirement of the access party and is obtained by filtering the specified data in the database.

Specifically, after receiving the access request for the database, a data processing apparatus may parse the data processing instruction. The data processing instruction includes conditional data, which is used to filter the specified data in the database, and determine the target data that meets a requirement of the access party. A requirements of the access party is a condition correspond to the conditional data. In different application scenarios, a user requirement varies. For example, a user requirement may include retrieving, updating, deleting, or filtering certain data in the database.

When the data processing instruction is an SQL statement, a where conditional statement in the SQL statement may be used as a filter statement for the conditional data. The where clause in the SQL statement is a keyword used to filter data records that meet conditions, and is commonly used in statements such as select and delete, to specify restrictions corresponding to some conditional data, thereby retrieving, updating, or deleting data from a specified database. Predicates in the where clause are specific expressions of these conditions, and may include a plurality of conditions connected by a logical operator (such as AND, OR, and NOT) to achieve complex filtering operations for the conditional data.

For example, if the data processing instruction is represented by the SQL statement as "select*from t1, t4 where t4.c2=t1.c2", the statement reflects that the specified data includes data included in a column c1 in a table t2 and data included a column c1 in a table t1. Target data corresponding to a user requirement is data in tables t1 to t4 that is the same with data in the column c2 in the table t1.

Step 102: In response to the specified data and/or the target data being subset data in encrypted data, querying an authorization information table in the database based on the user identifier of the access party to detect whether the access party is an authorized user for the specified data and/or the target data, where the encrypted data refers to data stored in the database in an encrypted form, and the authorization information table is used to record authorized user information configured by a data party for the encrypted data and to record subset information that does not require authorized access and is configured by the data party for the encrypted data.

It should be understood that according to embodiments of the present disclosure, to achieve the integration of the database and the TEE, all relevant data in the database is encapsulated in the TEE, with the encrypted data and the authorization information table being two types thereof.

Specifically, the database processing apparatus may determine whether the specified data and/or the target data are the subset data in the encrypted data. Specifically, whether the specified data and/or the target data are part of the encrypted data may be detected based on a data identifier of the specified data and/or the target data, and the part of data is the subset data. The encrypted data refers to ciphertext data that requires authorized access, which is generated by the TEE by applying an encryption key corresponding to the data party to encrypt data in the database that is specified to be encrypted by the data party, namely, data stored in an encrypted form.

In some embodiments, the database processing method may further include: receiving a creation instruction sent by the data party, where the creation instruction includes a user identifier of the data party, a data table identifier, and a data identifier of specified encrypted data corresponding to the data table identifier; applying an encryption key corresponding to the user identifier of the data party stored in the TEE to encrypt data corresponding to the data table identifier and the data identifier to generate encrypted data, filling a specified encrypted data identifier in an encrypted data field of a relational table, and writing, based on a mapping relationship between the encrypted data field and a creating user field in the relational table, the user identifier of the data party into the creating user field, corresponding to the specified encrypted data identifier.

The creation instruction may be an instruction for creating encrypted data and a relational table that stores a mapping relationship between the encrypted data and a creating user. The creation instruction may include a specific parameter required for creation, including a user identifier of the data party, a data table identifier, and a specified encrypted data identifier corresponding to the data table identifier. The user identifier of the data party is used to represent the current creating user, the data table identifier represents a data table that needs to be encrypted currently, and the specified encrypted data identifier corresponding to the data table identifier represents the specific data in the data table that needs to be encrypted. The encryption key of the TEE may be set according to the needs of a scenario. Typically, a public key of the TEE may be broadcast to the access party, etc., such that the accessing part may decrypt the encrypted data based on the public key.

After receiving the creation instruction sent by the data party, the database processing apparatus may obtain the corresponding data table in the database based on the data table identifier in the creation instruction, obtain the specified encrypted data from the data table based on the specified encrypted data identifier corresponding to the data table representation, and then encrypt the specified encrypted data based on the encryption key corresponding to the user identifier of the data party in the TEE to generate the encrypted data. That is, in this embodiment, only the specified encrypted data is encrypted, and not all the data in the data table is encrypted, thereby greatly improving the data encryption efficiency.

Further, the specified encrypted data identifier is filled in the encrypted data field of the relational table configured in the database, and based on the mapping relationship between the encrypted data field and the creating user field in the relational table, the user identifier of the data party is filled in the creating user field of the relational table, corresponding to the specified encrypted data identifier.

In some embodiments, after the relational table is encapsulated in the TEE, whether the specified data and/or the target data is the subset data in the encrypted data is detected based on the data identifier of the specified data and/or the target data, that is, data query is directly performed in the TEE without direct data interaction with the database. In this embodiment, the encrypted data field in the relational table is queried; if, in the encrypted data field, it is queried that the data identifier of the specified data and/or the target data is within a range of one encrypted data, it is determined that the specified data and/or the target data are the subset data in the encrypted data.

The authorization information table may be the same table as the above relational table, or may be a different table. The authorized user information includes at least one authorized user identifier, representing that at least one user corresponding to the at least one authorized user identifier is allowed to access the encrypted data. The authorization information table may record the authorized user information configured by the data party for the encrypted data, and record the subset information that does not require authorized access and is configured by the data party for the encrypted data.

In some embodiments, the database processing method may further include: receiving an authorization configuration instruction sent by the data party, where the authorization configuration instruction carries the user identifier of the data party, the data identifier of the specified data and/or the target data, and the user identifier of the authorized user. The authorization configuration instruction is used to indicate a configuration that the authorized user is authorized and allowed to access the specified data and/or the target data. In response to the authorization configuration instruction, a correspondence relationship among the user identifier of the data party, the data identifier of the specified data and/or the target data, and the user identifier of the authorized user is recorded in the authorization information table.

The authorization configuration instruction may be a specific instruction for configuring authorized access to the encrypted data, including user information, time information, etc. The authorization configuration instruction may include an authorized data identifier that allows authorized access, as well as the authorized user identifier corresponding to the authorized data identifier, and the user identifier of the data party. The authorized data identifier may be a data identifier of the encrypted data that requires authorized access. The authorized user identifier may be an identifier of a user allowed to access the encrypted data. The user identifier of the data party may be an identifier of a user who creates the encrypted data. In this embodiment the present disclosure, taking the configuration of the authorized user for the specified data and/or the target data as an example, the authorization configuration instruction includes the data identifier of the specified data and/or the target data, as well as the corresponding user identifiers of the authorized user and the data party.

The database processing apparatus receives the authorization configuration instruction sent by the data party. Based on a mapping relationship between the encrypted data field and an authorized user field in the authorization information table, the authorized user identifier is written into the authorized user field, corresponding to the authorized data identifier, to indicate that the user corresponding to the authorized user identifier is allowed to access the encrypted data corresponding to the authorized data identifier. Additionally, the user identifier of the data party is written into the creating user field, corresponding to the authorized data identifier. When the authorization configuration instruction carries the user identifier of the data party, the data identifier of the specified data and/or the target data, and the user identifier of the authorized user, the user identifier of the authorized user is written into the authorized user field of the authorization information table, corresponding to the data identifier of the specified data and/or the target data, and additionally, the user identifier of the data party is written into the creating user field of the authorization information table, corresponding to the data identifier of the specified data and/or the target data, thereby recording the correspondence relationship among the user identifier of the data party, the data identifier of the specified data and/or the target data, and the user identifier of the authorized user.

In the authorization information table, user identifiers of a plurality of authorized users are configured for one piece of specified data and/or one piece of target data of the data party. The authorization information table is dynamically updated with the authorization configuration instruction sent by the data party. In the authorization information table, user identifiers of one or more authorized users may be configured for one piece of specified data and/or one piece of target data, representing that the one or more authorized users are allowed to access the specified data and/or the target data. The above process of writing the authorized user identifier into the authorized user field, corresponding to the authorized data identifier, may be the process of writing one authorized user identifier into the authorized user field, corresponding to the authorized data identifier, to represent that only one user corresponding to one authorized user identifier is allowed to access the encrypted data corresponding to the authorized data identifier. Alternatively, a plurality of authorized user identifiers are written into the authorized user field, corresponding to the authorized data identifier, to represent that a plurality of users corresponding to a plurality of authorized user identifiers are allowed to access the encrypted data corresponding to the authorized data identifier. That is, one or more authorized user identifiers may be written into the authorized user field corresponding to the authorized data identifier, representing that one or more users corresponding to one or more authorized user identifiers are allowed to access the encrypted data corresponding to the authorized data identifier.

In this embodiment of the present disclosure, when the database processing apparatus detects that the specified data and/or the target data are the subset data in the encrypted data, the authorization information table in the database may be queried. Based on the correspondence relationship among the user identifier of the data party, the data identifier of the specified data and/or the target data, and the user identifier of the authorized user, the user identifier of the authorized user corresponding to the specified data and/or the target data is acquired to obtain an authorized user identifier set, that is, an authorized user identifier set in the authorized user field corresponding to the data identifier of the specified data and/or the target data is obtained. If the user identifier of the access party is queried from the authorized user identifier set, the access party is determined as the authorized user allowed to view the specified data and/or the target data. Otherwise, if the user identifier of the access party is not queried from the authorized user identifier set, it is determined that the access party is not the authorized user allowed to view the specified data and/or the target data.

In some embodiments, the specified data and/or the target data are at least one column of encrypted data corresponding to a specified column identifier in at least one data table, or the specified data and/or the target data are at least one row of encrypted data corresponding to a specified row identifier in the at least one data table, or the specified data and/or the target data are at least one encrypted data element corresponding to the specified column identifier and the specified row identifier in the at least one data table. That is, the specified data and/or the target data may include, but are not limited to, at least one column of encrypted data, at least one row of encrypted data, or at least one encrypted data element in the at least one data table, which are specifically set based on actual scenario needs.

Step 103: Detecting whether the subset data belongs to the subset information that does not require authorized access in the specified data and/or the target data in response to the access party being not the authorized user for the specified data and/or the target data.

The subset information that does not require authorized access in the specified data and/or the target data may be understood as information in the specified data and/or the target data that supports access by all users, which is publicly transparent information that can be accessed without special authorization. The subset information in the specified data and/or the target data that does not require authorized access is determined by a preset whitelist function, which means that the subset information that does not require authorized access may be stored in the authorization information table through a whitelist field.

In some embodiments of the present disclosure, the authorization configuration instruction may also include: a location identifier of the subset information that does not require authorized access in the specified data and/or the target data. The authorization configuration instruction is also used to indicate a configuration of the subset information that does not require authorized access in the specified data and/or the target data. The authorization information table specifically records a correspondence relationship among the user identifier of the data party, the data identifier of the specified data and/or the target data, and the location identifier of the subset information in the specified data and/or the target data that does not require authorized access.

The database processing apparatus may also write, in response to the authorization configuration instruction, the location identifier of the subset information in the specified data and/or the target data that does not require authorized access into the whitelist field, corresponding to the data identifier of the specified data and/or the target data, thereby recording the correspondence relationship among the user identifier of the data party, the data identifier of the specified data and/or the target data, and the location identifier of the subset information in the specified data and/or the target data that does not require authorized access.

In some embodiments, the location identifier of the subset information in the specified data and/or the target data that does not require authorized access includes a starting position and a data length of the subset information in the specified data and/or the target data, or including a starting position and an ending position of the subset information in the specified data and/or the target data. That is, in this embodiment, the subset information belongs to a part of the specified data and/or the target data. Based on the location identifier, namely, the starting position and the data length, or the starting position and the ending position, a specific part of the specified data and/or the target data that the subset information belongs to may be specifically defined. For example, when the specified data and/or the target data include a plurality of characters, the subset information indicates a starting character position and a total character length. For another example, when a data object is data in a column c1 of the data table t1, character data between a first character position and a sixth character position of the data in the column c1 may be taken as the subset information.

Optionally, a blacklist field may also be set in the authorization information table. In the authorization information table, a location identifier of the subset information that requires authorized access in the specified data and/or the target data is written into the blacklist field, corresponding to the data identifier of the specified data and/or the target data, thereby recording the correspondence relationship among the user identifier of the data party, the data identifier of the specified data and/or the target data, the location identifier of the subset information in the specified data and/or the target data that requires authorized access, and the user identifier of the authorized user. The subset information in the specified data and/or the target data that requires authorized access is other information in addition to the above subset information in the specified data and/or the target data that does not require authorized access. The whitelist field corresponds to data that is publicly viewable by any user, namely, the subset information in the specified data and/or the target data that can be viewed by any user. The blacklist field corresponds to data that is only accessible by an authorized user, namely, the subset information in the specified data and/or the target data that can be viewed by an authorized user.

In this embodiment of the present disclosure, when the database processing apparatus detects that the access party is not the authorized user for the specified data and/or the target data, the authorization information table may be queried. Based on the correspondence relationship between the data identifier of the specified data and/or the target data, and the location identifier of the subset information in the specified data and/or the target data that does not require authorized access, the location identifier of the subset information in the specified data and/or the target data that does not require authorized access is obtained. Whether the subset data is within the range of the subset information in the specified data and/or the target data that does not require authorized access is determined. If the subset data is the subset information that does not require authorized access in the specified data and/or the target data, or a subset of the subset information that does not require authorized access in the specified data and/or the target data, it is determined that the subset data belongs to the subset information in the specified data and/or the target data that does not require authorized access. If the subset data is not within the range of the subset information in the specified data and/or the target data that does not require authorized access, it is determined that the subset data does not belong to the subset information in the specified data and/or the target data that does not require authorized access.

Step 104: In response to the subset data belonging to the subset information that does not require authorized access in the specified data and/or the target data, executing a data processing instruction to process the specified data to obtain target data, and return the target data in response to the access request.

In this embodiment of the present disclosure, when the database processing apparatus detects that the subset data belongs to the subset information in the specified data and/or the target data that does not require authorized access, it indicates that the subset information is data accessible by any user, thereby executing the data processing instruction to process the specified data to obtain the target data, and feeding the target data back to the access party. When it is detected that the subset data does not belong to the subset information that does not require authorized access in the specified data and/or the target data, it indicates that the subset information is data accessible by an authorized use. Because it has been determined above that the access party is not the authorized user of the specified data and/or the target data, an access failure prompt message is sent to the access party. The failure prompt message may be set according to any scenario need and is not limited here.

For example, when the subset information in the specified data and/or the target data that does not require authorized access corresponds to SUBSTR(c1, 1, 6) (i.e., data between a first character and a sixth character in the column c1 in the data table), a data processing instruction sent by the access party (user 2) is acquired as select SUBSTR(c1, 1, 6), Where SUBSTR (c1, 1, 6)='123456'. When it is determined that the access party is not the authorized user, through the query, it is known that the target data corresponding to the data processing instruction belongs to the subset information in the specified data and/or the target data that does not require authorized access, therefore, the target data is sent to the access party (user 2). If the access party is the authorized user, the target data may be sent to the access party (user 2) regardless of whether the target data belongs to the subset information in the specified data and/or the target data that does not require authorized access.

As shown in FIG. 2, when the specified data and/or the target data corresponding to the data processing instruction sent by the access party from the database is subset data of the encrypted data, whether the access party has a permission of being authorized is verified. When the access party is not the authorized user for the specified data and/or the target data, whether the subset data is the subset information that does not require authorized access or not is verified, and because the data that does not require authorized access may be accessible by any user, the process of multi-time encryption and decryption between the user side and the database, etc. is avoided. For example, the acquired target data is encrypted by the database and sent to the user side where the access party is located, without the need for encrypting and transmitting the acquired target data to the database, thereby improving the efficiency of data processing, and ensuring the security and reliability of data processing by only feeding back data that does not require authorization to unauthorized users.

Therefore, in this embodiment of the present disclosure, a database management system (DBMS) is encapsulated in the TEE (referred to as a TEE-DBMS integration technology), and the reading of related conditional data of the user side and the database is implemented in the TEE. The technology is a secure data processing architecture that tightly integrates the TEE with the DBMS, and may provide a higher level of data security protection. In the architecture, the TEE may be used to perform all SQL operations, including data creation, updating, deletion, querying, computing, and processing, thereby achieving complete database system functions. A core idea of the TEE-DBMS integration technology is to use the TEE to replace a conventional DBMS engine, with all data operations being completed within the TEE. The TEE-DBMS integration technology has the following advantages: 1. Data confidentiality: the TEE may use secure computing technologies such as encryption, hashing, and digital signatures to protect data confidentiality. These technologies may prevent data leakage, tampering, forgery, etc. 2. Data integrity: the TEE may provide powerful data integrity protection mechanisms based on data structures, business rules, etc. These mechanisms may ensure that data is not tampered with, lost, or damaged during transmission, thereby guaranteeing data integrity. 3. Fine-grained access control: the TEE may provide flexible data access control policies, allowing only authorized users to access data, thereby preventing unauthorized access and exploitation. 4. Higher security: encapsulating the DBMS within the TEE may reduce an attack surface and security threats to the database system. The TEE also has autonomous security assessment and detection capabilities, which may further enhance the security of the database system.

Moreover, in the technical solution, data processing can be achieved through direct interaction between the access party and the executable environment, thereby avoiding frequent encryption and decryption processes between the database and related security platforms, not only ensuring security but also maintaining the efficiency of database processing, and making it easier to meet actual business requirements especially when the demand on the database is particularly high. In the authorization information table of the database, data that requires TEE encryption processing is configured, namely encrypted data, but it is also possible to configure data within the encrypted data that does not require authorized access, namely, data that can be released, as well as data that requires authorized access. The processing instruction is executed based on the authorization information table, thereby ensuring the security and reliability of data processing. The data that does not require authorized access may be accessed by any user, while the data that requires authorized access is only accessible by the authorized user. Therefore, the security of data processing is ensured. Additionally, only the data that requires authorized access may be encrypted, thereby reducing the frequency of data encryption and decryption, and further improving the efficiency of data processing.

In summary, according to the database processing solution provided in this embodiment of the present disclosure, the access request for the database is received, where the access request carries a user identifier of the access party and a data processing instruction; the data processing instruction is used to indicate a processing of the specified data in the database to obtain the target data; the database is deployed in the separated secure execution environment; when the specified data and/or the target data are the subset data in the encrypted data, the authorization information table in the database is queried based on the user identifier of the access party to detect whether the access party is the authorized user for the specified data and/or the target data, where the encrypted data refers to the data stored in the database in the encrypted form; the authorization information table is used to record the authorized user information configured by the data party for the encrypted data and to record the subset information that does not require authorized access and is configured by the data party for the encrypted data; whether the subset data belongs to the subset information in the specified data and/or the target data that does not require authorized access is detected when the access party is not the authorized user for the specified data and/or the target data; and the data processing instruction is executed to process the specified data to obtain the target data, and the target data is returned in response to the access request when the subset data belongs to the subset information in the specified data and/or the target data that does not require authorized access.

In this embodiment of the present disclosure, the database is completely encapsulated within the separated secure execution environment, thereby achieving integration between the database and the secure execution environment. By isolating the relevant data within the secure execution environment, data security is ensured, and the interaction between the user side and the database is more convenient. There is no need for data encryption before transmission on the user side, and the database does not require tedious data interaction with other security platforms, thereby improving the efficiency of data processing. Additionally, in the technical solution, the specified data and/or the target data are determined based on the data processing instruction sent by the access party. Encryption detection is performed on the specified data and/or the target data. If the specified data and/or the target data are the subset data of the encrypted data, the authorization detection is performed on the specified data and/or the target data based on the user identifier of the access party and the authorization information table. If the authorization detection fails, whether the subset data does not require authorized access may be detected. When the subset data does not require authorized access, the target data is returned. The data that does not require authorized access may be accessed by any user, thereby reducing the frequency of data encryption and decryption, and further improving the efficiency of data processing on the basis of ensuring the security and reliability of data processing.

In some embodiments of the present disclosure, the authorization configuration instruction may also include an authorized access time limit. The authorization information table specifically records a correspondence relationship between the user identifier of the data party, the data identifier of the specified data and/or the target data, the user identifier of the authorized user, and the authorized access time limit, where the authorized access time limit is used to limit the time that the authorized user accesses the specified data and/or the target data.

The authorized access time limit may be a duration set for the encrypted data, allowing access to the encrypted data within the duration, and disallowing access to the encrypted data once the duration is exceeded. The authorization configuration instruction in the above embodiments may also include the authorized access time limit, and the authorized access time limit corresponds to the specified data and/or the target data. The database processing apparatus may record the correspondence relationship among the user identifier of the data party, the data identifier of the specified data and/or the target data, the user identifier of the authorized user, and the authorized access time limit in the authorization information table. That is, based on writing the user identifier of the authorized user into the authorized user field in the authorization information table, corresponding to the data identifier of the specified data and/or the target data, the authorized access time limit for the data identifier of the specified data and/or the target data is further written into the authorized user field corresponding to the data identifier of the specified data and/or the target data, indicating that the user corresponding to the user identifier of the authorized user is only allowed to access the specified data and/or the target data within the authorized access time limit.

When the authorized access time limit corresponds to the authorized user identifier, the database processing apparatus may record the correspondence relationship among the user identifier of the data party, the authorized data identifier, the authorized user identifier, and the authorized access time limit in the authorization information table. That is, based on writing the authorized user identifier into the authorized user field in the authorization information table, corresponding to the authorized data identifier, the authorized access time limit for the authorized user identifier is further written into the authorized user field corresponding to the authorized data identifier, indicating that the user corresponding to the authorized user identifier is only allowed to access the encrypted data corresponding to the authorized data identifier within the authorized access time limit.

When it is detected that the access party is the authorized user, the authorization information table may be queried to obtain the authorized access time limit corresponding to the user identifier of the access party in the authorized user field, and whether a current access time is within the authorized access time limit corresponding to the user identifier of the access party is determined. If yes, the data processing instruction is executed to process the specified data and/or the target data to obtain the target data, and the target data is returned in response to the access request; and if not, a processing failure prompt message is returned to the access party. By adding the authorized access time limit, time verification is incorporated into the permission verification for the access party, thereby further enhancing the security of data processing.

In some embodiments of the present disclosure, the database processing method may further include: receiving an authorization deletion instruction sent by the data party, where the authorization deletion instruction carries the user identifier of the data party, the data identifier of the specified data and/or the target data, and the user identifier of the authorized user. The authorization deletion instruction is used to indicate a deletion of configuration information that the authorized user is authorized and allowed to access the specified data and/or the target data. In response to the authorization deletion instruction, the correspondence relationship among the user identifier of the data party, the data identifier of the specified data and/or the target data, and the user identifier of the authorized user is deleted from the authorization information table.

The authorization deletion instruction may be an instruction configured for the encrypted data to delete user information for authorized access. The authorization deletion instruction includes a user identifier of an authorized user that needs to be deleted, and may also include a data identifier of data to be deleted and a user identifier of a corresponding data party. In this embodiment of the present disclosure, taking the data to be deleted as the specified data and/or the target data for an example, the authorization deletion instruction may also include the data identifier of the specified data and/or the target data, as well as the user identifier of the data party.

The data processing apparatus receives the authorization deletion instruction sent by the data party, and deletes, in response to the authorization deletion instruction, at least one of the user identifier of the data party, the data identifier of the specified data and/or the target data, and the user identifier of the authorized user in the authorization information table, thereby deleting the correspondence relationship among the user identifier of the data party, the data identifier of the specified data and/or the target data, and the user identifier of the authorized user. The solution supports the deletion of the configuration information that the authorized user is authorized to access the specified data and/or the target data, thereby making data permission configuration more flexible and better meeting the actual business requirements.

Figure 3:
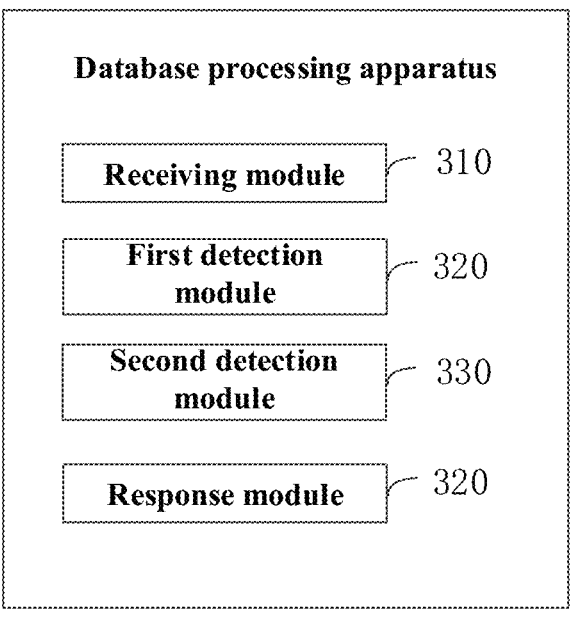
FIG. 3 is a structural schematic diagram of a database processing apparatus according to an embodiment of the present disclosure.
Figure 4:
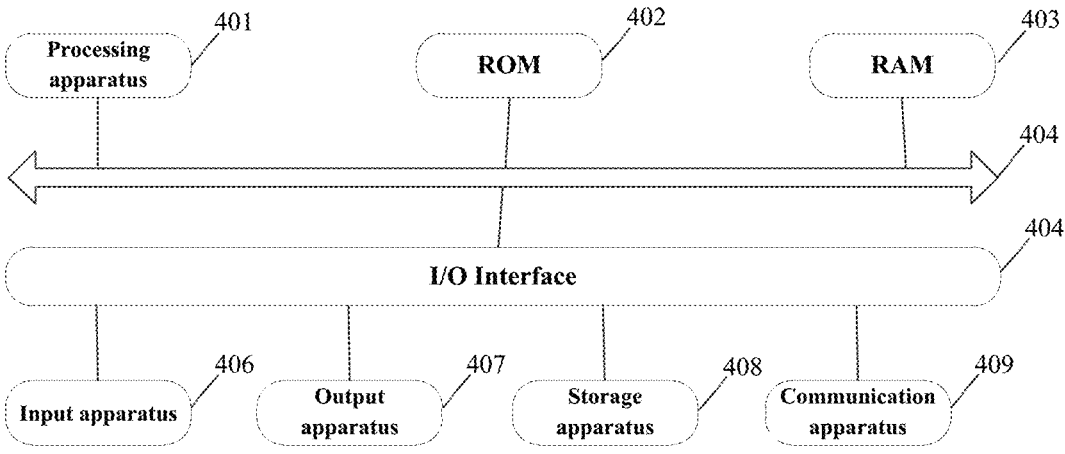
FIG. 4 is a structural schematic diagram of an electronic device according to an embodiment of the present disclosure.

In order to implement the above embodiments, the present disclosure further provides a database processing apparatus. FIG. 4 is a structural schematic diagram of a database processing apparatus according to an embodiment of the present disclosure. The apparatus may be implemented by software and/or hardware, and may be typically integrated in an electronic device for database processing. As shown in FIG. 3, the apparatus includes a receiving module 310, a first detection module 320, a second detection module 330, and a response module 340.

The receiving module 310 is configured to receive an access request for a database, where the access request carries a user identifier of an access party and a data processing instruction, the data processing instruction is used to indicate processing of specified data in the database to obtain target data, and the database is deployed in a separated secure execution environment.

The first detection module 320 is configured to query an authorization information table in the database based on the user identifier of the access party to detect whether the access party is an authorized user for the specified data and/or the target data in response to the specified data and/or the target data being subset data in encrypted data, where the encrypted data refers to data stored in the database in an encrypted form, and the authorization information table is used to record authorized user information configured by a data party for the encrypted data and to record subset information that does not require authorized access and is configured by the data party for the encrypted data.

The second detection module 330 is configured to detect whether the subset data belongs to the subset information in the specified data and/or the target data that does not require authorized access in response to the access party being not the authorized user for the specified data and/or the target data.

The response module 340 is configured to in response to the subset data belonging to the subset information in the specified data and/or the target data that does not require authorized access, execute the data processing instruction to process the specified data to obtain target data, and return the target data in response to the access request.

Optionally, the apparatus further includes an authorization configuration module, configured to: receive an authorization configuration instruction sent by the data party, where the authorization configuration instruction carries a user identifier of a data party, a data identifier of the specified data and/or the target data, and a user identifier of an authorized user, and the authorization configuration instruction is used to indicate a configuration that the authorized user is authorized and allowed to access the specified data and/or the target data; and record, in response to the authorization configuration instruction, a correspondence relationship between the user identifier of the data party, the data identifier of the specified data and/or the target data, and the user identifier of the authorized user in the authorization information table.

Optionally, the authorization configuration instruction further includes: a location identifier of the subset information in the specified data and/or the target data that does not require authorized access; the authorization configuration instruction is further used to indicate the configuration of the subset information in the specified data and/or the target data that does not require authorized access; and the authorization information table specifically records a correspondence relationship between the user identifier of the data party, the data identifier of the specified data and/or the target data, and the location identifier of the subset information in the specified data and/or the target data that does not require authorized access.

Optionally, the subset information in the specified data and/or the target data that does not require authorized access is determined through a preset whitelist function.

Optionally, the authorization configuration instruction further includes: an authorized access time limit, where the authorization information table specifically records a correspondence relationship between the user identifier of the data party, the data identifier of the specified data and/or the target data, the user identifier of the authorized user, and the authorized access time limit, and the authorized access time limit is used to limit the time that the authorized user accesses the specified data and/or the target data.

Optionally, the apparatus further includes an authorization deletion module, configured to: receive an authorization deletion instruction sent by the data party, where the authorization deletion instruction carries the user identifier of the data party, the data identifier of the specified data and/or the target data, and the user identifier of the authorized user, and the authorization deletion instruction is used to indicate the deletion of configuration information that the authorized user is authorized and allowed to access the specified data and/or the target data; and delete, in response to the authorization deletion instruction, the correspondence relationship between the user identifier of the data party, the data identifier of the specified data and/or the target data, and the user identifier of the authorized user in the authorization information table.

Optionally, in the authorization information table, user identifiers of a plurality of authorized users are configured for one piece of specified data and/or one piece of target data of the data party.

Optionally, the authorization information table is dynamically updated with the authorization configuration instruction sent by the data party.

Optionally, the specified data and/or the target data are at least one column of encrypted data corresponding to a specified column identifier in at least one data table, or the specified data and/or the target data are at least one row of encrypted data corresponding to a specified row identifier in the at least one data table, or the specified data and/or the target data are at least one encrypted data element corresponding to the specified column identifier and the specified row identifier in the at least one data table.

Optionally, the database is deployed in the trusted execution environment.

Optionally, the database is deployed in the trusted execution environment based on trusted hardware.

The database processing apparatus provided by this embodiment of the present disclosure may perform the database processing method provided by any embodiment of the present disclosure, and has corresponding functional modules and beneficial effects for performing the method, and an implementation principle is similar, and is not repeated herein.

To implement the above embodiments, the present disclosure further provides a computer program product including computer programs/instructions. The computer programs/instructions, when executed by a processor, implement the database processing method in the above embodiment.

FIG. 4 is a structural schematic diagram of an electronic device according to an embodiment of the present disclosure.

Specifically referring to FIG. 4 below, FIG. 4 illustrates a structural schematic diagram of an electronic device 400 suitable for implementing an embodiment of the present disclosure. The electronic device 400 in this embodiment of the present disclosure may include, but is not limited to, mobile terminals such as a mobile phone, a notebook computer, a digital radio receiver, a personal digital assistant (PDA), a portable Android device (PAD), a portable media player (PMP), and a vehicle-mounted terminal (e.g., a vehicle-mounted navigation terminal), and fixed terminals such as a digital TV and a desktop computer. The electronic device shown in FIG. 4 is merely an example, which should not impose any limitations on functions and application ranges of this embodiment of the present disclosure.

As shown in FIG. 4, the electronic device 400 may include a processing apparatus (e.g., a central processing unit and a graphics processing unit) 401 that may perform various suitable actions and processes based on a program stored in a read-only memory (ROM) 402 or a program loaded from a storage apparatus 408 into a random access memory (RAM) 403. The RAM 403 further stores various programs and data required for the operation of the electronic device 400. The processing apparatus 401, the ROM 402, and the RAM 403 are connected to one another through a bus 404. An input/output (I/O) interface 405 is also connected to the bus 404.

Typically, the following apparatuses may be connected to the I/O interface 405: an input apparatus 406, including, for example, a touchscreen, a touchpad, a keyboard, a mouse, a camera, a microphone, an accelerometer, and a gyroscope; an output apparatus 407, including, for example, a liquid crystal display (LCD), a speaker, and a vibrator; the storage apparatus 408, including, for example, a magnetic tape and a hard drive; and a communication apparatus 409. The communication apparatus 409 may allow the electronic device 400 to be in wireless or wired communication with other devices for data exchange. Although FIG. 4 illustrates the electronic device 400 with various apparatuses, it should be understood that it is not necessary to implement or have all the shown apparatuses. Alternatively, more or fewer apparatuses may be implemented or provided.

Particularly, the foregoing process described with reference to the flowcharts according to the embodiments of the present disclosure may be implemented as a computer software program. For example, an embodiment of the present disclosure includes a computer program product, which includes a computer program carried on a non-transitory computer-readable medium, where the computer program includes program code for performing the method shown in the flowchart. In such embodiment, the computer program may be downloaded and installed from the network through the communication apparatus 409, or installed from the storage apparatus 408, or installed from the ROM 402. The computer program, when executed by the processing apparatus 401, implements the above functions limited in the database processing method according to this embodiment of the present disclosure.

It should be noted that the computer-readable medium in the present disclosure may be either a computer-readable signal medium or a computer-readable storage medium, or any combination of the two. The computer-readable storage medium may be, for example, but is not limited to, electric, magnetic, optical, electromagnetic, infrared, or semiconductor systems, apparatuses, or devices, or any combination of the above. More specific examples of the computer-readable storage medium may include, but are not limited to: an electrical connection with one or more wires, a portable computer disk, a hard drive, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination of the above. In the present disclosure, the computer-readable storage medium may be any tangible medium including or storing a program, and the program may be used by or in conjunction with an instruction execution system, apparatus, or device. However, in the present disclosure, the computer-readable signal medium may include a data signal propagated in a baseband or as a part of a carrier, where the data signal carries computer-readable program code. The propagated data signal may take various forms, including but not limited to an electromagnetic signal, an optical signal, or any suitable combination of the above. The computer-readable signal medium may also be any computer-readable medium other than the computer-readable storage medium. The computer-readable signal medium may send, propagate, or transmit a program for use by or for use in conjunction with the instruction execution system, apparatus, or device. The program code included in the computer-readable medium may be transmitted by any suitable medium including but not limited to a wire, an optical cable, radio frequency (RF), etc., or any suitable combination of the above.

In some implementations, a client and a server may communicate using any currently known or future-developed network protocols such as a hypertext transfer protocol (HTTP), and may also be interconnected with digital data communication in any form or medium (e.g., a communication network). Examples of the communication network include a local area network ("LAN"), a wide area network ("WAN"), an internetwork (e.g., the Internet), a peer-to-peer network (e.g., an ad hoc peer-to-peer network), and any currently known or future-developed network.

The computer-readable medium may be included in the above electronic device; or may also separately exist without being assembled in the electronic device.

The computer-readable medium carries one or more programs. The one or more programs, when executed by the electronic device, cause the electronic device to:

receive an access request for a database, where the access request carries a user identifier of an access party and a data processing instruction; the data processing instruction is used to indicate the processing of specified data in the database to obtain target data; and the database is deployed in a separated secure execution environment; query an authorization information table in the database based on the user identifier of the access party to detect whether the access party is an authorized user for the specified data and/or the target data in response to the specified data and/or the target data being subset data in encrypted data, where the encrypted data refers to data stored in the database in an encrypted form; and the authorization information table is used to record authorized user information configured by a data party for the encrypted data and to record subset information that does not require authorized access and is configured by the data party for the encrypted data; detect whether the subset data belongs to the subset information in the specified data and/or the target data that does not require authorized access in response to the access party being not the authorized user for the specified data and/or the target data; and execute a data processing instruction to process the specified data to obtain target data, and return the target data in response to the access request when the subset data belongs to the subset information in the specified data and/or the target data that does not require authorized access. In this embodiment of the present disclosure, the database is completely encapsulated within the separated secure execution environment, thereby achieving integration between the database and the secure execution environment. By isolating the relevant data within the secure execution environment, data security is ensured, and the interaction between the user side and the database is more convenient. There is no need for data encryption before transmission on the user side, and the database does not require tedious data interaction with other security platforms, thereby improving the efficiency of data processing. Additionally, in the technical solution, the specified data and/or the target data are determined based on the data processing instruction sent by the access party. Encryption detection is performed on the specified data and/or the target data. If the specified data and/or the target data are the subset data of the encrypted data, the authorization detection is performed on the specified data and/or the target data based on the user identifier of the access party and the authorization information table. If the authorization detection fails, whether the subset data does not require authorized access may be detected. When the subset data does not require authorized access, the target data is returned. The data that does not require authorized access may be accessed by any user, thereby reducing the frequency of data encryption and decryption, and further improving the efficiency of data processing on the basis of ensuring the security and reliability of data processing.

Computer program code for performing operations of the present disclosure may be written in one or more programming languages or a combination thereof, where the programming languages include, but are not limited to, object-node-oriented programming languages, such as Java, Smalltalk, and C++, and further include conventional procedural programming languages, such as "C" language or similar programming languages. The program code may be executed entirely on a user computer, partly on the user computer, as a stand-alone software package, partly on the user computer and partly on a remote computer, or entirely on the remote computer or the server. In the case of involving the remote computer, the remote computer may be connected to the user computer through any type of network, including a local area network (LAN) or a wide area network (WAN), or may be connected to an external computer (e.g., utilizing an Internet service provider for Internet connectivity).

The flowcharts and the block diagrams in the accompanying drawings illustrate the possibly implemented system architecture, functions, and operations of the system, the method, and the computer program product according to the various embodiments of the present disclosure. In this regard, each block in the flowcharts or the block diagrams may represent a module, a program segment, or a part of code, and the module, the program segment, or the part of code includes one or more executable instructions for implementing specified logic functions. It should also be noted that in some alternative implementations, the functions marked in the blocks may also occur in an order different from that marked in the accompanying drawings. For example, two blocks shown in succession may actually be performed substantially in parallel, or may sometimes be performed in a reverse order, depending on functions involved. It should also be noted that each block in the block diagrams and/or the flowcharts, and a combination of the blocks in the block diagrams and/or the flowcharts may be implemented by using a dedicated hardware-based system that performs specified functions or operations, or may be implemented by using a combination of dedicated hardware and computer instructions.

The related units described in the embodiments of the present disclosure may be implemented by software or hardware. The name of the unit does not limit the unit in certain cases.

Herein, the functions described above may be at least partially executed by one or more hardware logic components. For example, without limitation, exemplary hardware logic components that can be used include: a field-programmable gate array (FPGA), an application specific integrated circuit (ASIC), an application specific standard part (ASSP), a system on chip (SOC), a complex programmable logic device (CPLD), etc.

In the context of the present disclosure, a machine-readable medium may be a tangible medium that may contain or store a program for use by or for use in conjunction with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include an electrical connection based on one or more wires, a portable computer disk, a hard drive, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above content.

What are described above are only preferred embodiments of the present disclosure and explanations of the technical principles applied. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure, such as a technical solution formed by replacing the foregoing features with the technical features with similar functions disclosed (but not limited to) in the present disclosure.

Further, although the operations are described in a particular order, it should not be understood as requiring these operations to be performed in the shown particular order or in a sequential order. In certain environments, multitasking and parallel processing may be advantageous. Similarly, although several specific implementation details are included in the above discussion, these specific implementation details should not be interpreted as limitations on the scope of the present disclosure. Some features that are described in the context of separate embodiments may also be implemented in combination in a single embodiment. In contrast, various features described in the context of a single embodiment may alternatively be implemented in a plurality of embodiments separately or in any suitable subcombination.

Although the subject matter has been described in a language specific to structural features and/or logic actions of the method, it should be understood that the subject matter defined in the appended claims is not necessarily limited to the specific features or actions described above. On the contrary, the specific features and actions described above are merely example forms for implementing the claims.

The invention claimed is:

1. A database processing method, comprising:

receiving an access request for a database, wherein the access request carries a user identifier of an access party and a data processing instruction, the data processing instruction is used to indicate processing of specified data in the database to obtain target data, and the database is deployed in a separated secure execution environment;

querying an authorization information table in the database based on the user identifier of the access party to detect whether the access party is an authorized user for the specified data and/or the target data in response to the specified data and/or the target data being subset data in encrypted data, wherein the encrypted data comprises data stored in the database in an encrypted form, and the authorization information table is used to record authorized user information configured by a data party for the encrypted data and to record subset information that does not require authorized access and is configured by the data party for the encrypted data;

detecting whether the subset data belongs to the subset information in the specified data and/or the target data that does not require authorized access in response to the access party being not the authorized user for the specified data and/or the target data; and in response to the subset data belonging to the subset information in the specified data and/or the target data that does not require authorized access, executing the data processing instruction to process the specified data to obtain target data, and returning the target data in response to the access request.

2. The method according to claim 1, further comprising:

receiving an authorization configuration instruction sent by the data party, wherein the authorization configuration instruction carries a user identifier of the data party, a data identifier of the specified data and/or the target data, and a user identifier of the authorized user, and wherein the authorization configuration instruction is used to indicate a configuration that the authorized user is authorized and allowed to access the specified data and/or the target data; and in response to the authorization configuration instruction, recording a correspondence relationship among the user identifier of the data party, the data identifier of the specified data and/or the target data, and the user identifier of the authorized user in the authorization information table.

3. The method according to claim 2, wherein the authorization configuration instruction further comprises a location identifier of the subset information in the specified data and/or the target data that does not require authorized access, the authorization configuration instruction is further used to indicate a configuration of the subset information in the specified data and/or the target data that does not require authorized access; and wherein the authorization information table records a correspondence relationship among the user identifier of the data party, the data identifier of the specified data and/or the target data, and the location identifier of the subset information in the specified data and/or the target data that does not require authorized access.

4. The method according to claim 3, wherein the subset information in the specified data and/or the target data that does not require authorized access is determined through a preset whitelist function.

5. The method according to claim 2, wherein the authorization configuration instruction further comprises:

an authorized access time limit, wherein the authorization information table records a correspondence relationship among the user identifier of the data party, the data identifier of the specified data and/or the target data, the user identifier of the authorized user, and the authorized access time limit, wherein the authorized access time limit is used to limit a time that the authorized user accesses the specified data and/or the target data.

6. The method according to claim 1, further comprising:

receiving an authorization deletion instruction sent by the data party, wherein the authorization deletion instruction carries a user identifier of the data party, a data identifier of the specified data and/or the target data, and a user identifier of the authorized user, and wherein the authorization deletion instruction is used to indicate a deletion of configuration information that the authorized user is authorized and allowed to access the specified data and/or the target data; and in response to the authorization deletion instruction, deleting a correspondence relationship among the user identifier of the data party, the data identifier of the specified data and/or the target data, and the user identifier of the authorized user from the authorization information table.

7. The method according to claim 1, wherein user identifiers of a plurality of authorized users are configured for one piece of specified data and/or one piece of target data of the data party in the authorization information table.

8. The method according to claim 1, wherein the authorization information table is dynamically updated with an authorization configuration instruction sent by the data party.

9. The method according to claim 1, wherein the specified data and/or the target data are at least one column of encrypted data corresponding to a specified column identifier in at least one data table, or the specified data and/or the target data are at least one row of encrypted data corresponding to a specified row identifier in the at least one data table, or the specified data and/or the target data are at least one encrypted data element corresponding to a specified column identifier and a specified row identifier in the at least one data table.

10. The method according to claim 1, wherein the database is deployed in a trusted execution environment.

11. The method according to claim 1, wherein the database is deployed in a trusted execution environment based on trusted hardware.

12. An electronic device, comprising:

a processor; and a memory configured to store instructions that are operable, when executed by the processor, to cause the electronic device to perform operations comprising:

receiving an access request for a database, wherein the access request carries a user identifier of an access party and a data processing instruction, the data processing instruction is used to indicate processing of specified data in the database to obtain target data, and the database is deployed in a separated secure execution environment;

querying an authorization information table in the database based on the user identifier of the access party to detect whether the access party is an authorized user for the specified data and/or the target data in response to the specified data and/or the target data being subset data in encrypted data, wherein the encrypted data comprises data stored in the database in an encrypted form, and the authorization information table is used to record authorized user information configured by a data party for the encrypted data and to record subset information that does not require authorized access and is configured by the data party for the encrypted data;

detecting whether the subset data belongs to the subset information in the specified data and/or the target data that does not require authorized access in response to the access party being not the authorized user for the specified data and/or the target data; and in response to the subset data belonging to the subset information in the specified data and/or the target data that does not require authorized access, executing the data processing instruction to process the specified data to obtain target data, and returning the target data in response to the access request.

13. The electronic device according to claim 12, wherein the memory is configured to store instructions that are operable, when executed by the processor, to cause the electronic device to perform operations comprising:

receiving an authorization configuration instruction sent by the data party, wherein the authorization configuration instruction carries a user identifier of the data party, a data identifier of the specified data and/or the target data, and a user identifier of the authorized user, and wherein the authorization configuration instruction is used to indicate a configuration that the authorized user is authorized and allowed to access the specified data and/or the target data; and in response to the authorization configuration instruction, recording a correspondence relationship among the user identifier of the data party, the data identifier of the specified data and/or the target data, and the user identifier of the authorized user in the authorization information table.

14. The electronic device according to claim 13, wherein the authorization configuration instruction further comprises a location identifier of the subset information in the specified data and/or the target data that does not require authorized access, the authorization configuration instruction is further used to indicate a configuration of the subset information in the specified data and/or the target data that does not require authorized access; and wherein the authorization information table records a correspondence relationship among the user identifier of the data party, the data identifier of the specified data and/or the target data, and the location identifier of the subset information in the specified data and/or the target data that does not require authorized access.

15. The electronic device according to claim 14, wherein the subset information in the specified data and/or the target data that does not require authorized access is determined through a preset whitelist function.

16. The electronic device according to claim 13, wherein the authorization configuration instruction further comprises:

an authorized access time limit, wherein the authorization information table records a correspondence relationship among the user identifier of the data party, the data identifier of the specified data and/or the target data, the user identifier of the authorized user, and the authorized access time limit, wherein the authorized access time limit is used to limit a time that the authorized user accesses the specified data and/or the target data.

17. The electronic device according to claim 12, wherein the memory is configured to store instructions that are operable, when executed by the processor, to cause the electronic device to perform operations comprising:

receiving an authorization deletion instruction sent by the data party, wherein the authorization deletion instruction carries a user identifier of the data party, a data identifier of the specified data and/or the target data, and a user identifier of the authorized user, and wherein the authorization deletion instruction is used to indicate a deletion of configuration information that the authorized user is authorized and allowed to access the specified data and/or the target data; and in response to the authorization deletion instruction, deleting a correspondence relationship among the user identifier of the data party, the data identifier of the specified data and/or the target data, and the user identifier of the authorized user from the authorization information table.

18. The electronic device according to claim 12, wherein the specified data and/or the target data are at least one column of encrypted data corresponding to a specified column identifier in at least one data table, or the specified data and/or the target data are at least one row of encrypted data corresponding to a specified row identifier in the at least one data table, or the specified data and/or the target data are at least one encrypted data element corresponding to a specified column identifier and a specified row identifier in the at least one data table.

19. The electronic device according to claim 12, wherein the database is deployed in a trusted execution environment.

20. A non-transient computer-readable storage medium, is configured to store a computer program that, when executed by one or more computers, cause a device to perform operations comprising:

receiving an access request for a database, wherein the access request carries a user identifier of an access party and a data processing instruction, the data processing instruction is used to indicate processing of specified data in the database to obtain target data, and the database is deployed in a separated secure execution environment;

querying an authorization information table in the database based on the user identifier of the access party to detect whether the access party is an authorized user for the specified data and/or the target data in response to the specified data and/or the target data being subset data in encrypted data, wherein the encrypted data comprises data stored in the database in an encrypted form, and the authorization information table is used to record authorized user information configured by a data party for the encrypted data and to record subset information that does not require authorized access and is configured by the data party for the encrypted data;

detecting whether the subset data belongs to the subset information in the specified data and/or the target data that does not require authorized access in response to the access party being not the authorized user for the specified data and/or the target data; and in response to the subset data belonging to the subset information in the specified data and/or the target data that does not require authorized access, executing the data processing instruction to process the specified data to obtain target data, and returning the target data in response to the access request.

\* \* \* \* \*